US012673699B2

(12) United States Patent
Drusinsky et al.

(10) Patent No.: US 12,673,699 B2
(45) Date of Patent: Jul. 7, 2026

(54) METHOD OF MACHINE-LEARNED VERIFICATION AND ADVANCE NOTICE ORACLES FOR AUTONOMOUS SYSTEMS

(71) Applicant: THE UNITED STATES OF AMERICA AS REPRESENTED BY THE SECRETARY OF THE NAVY, Arlington, VA (US)

(72) Inventors: Doron Drusinsky, Cupertino, CA (US); Matthew Leonard Litton, Marina, CA (US); James Bret Michael, Pebble Beach, CA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 121 days.

(21) Appl. No.: 18/809,958

(22) Filed: Aug. 20, 2024

(65) Prior Publication Data

US 2025/0083702 A1 Mar. 13, 2025

Related U.S. Application Data

(60) Provisional application No. 63/538,009, filed on Sep. 12, 2023.

(51) Int. Cl.
*B60W 60/00* (2020.01)
*G06N 7/01* (2023.01)

(52) U.S. Cl.
CPC ........... *B60W 60/0015* (2020.02); *G06N 7/01* (2023.01); *B60W 2520/105* (2013.01)

(58) Field of Classification Search
None
See application file for complete search history.

(56) References Cited

U.S. PATENT DOCUMENTS 12,258,008 B1 * 3/2025 Kurutach ........... B60W 60/0011
12,485,882 B1 * 12/2025 Wang ................... B60W 30/09
(Continued)

OTHER PUBLICATIONS

D. Drusinsky, M. Litton and J. B. Michael, "Machine-Learned Verification and Advance Notice Oracles for Autonomous Systems," in Computer, vol. 56, No. 7, pp. 121-130, Jul. 2023, doi: 10.1109/MC.2023.3265732 (Year: 2023).*
(Continued)

*Primary Examiner* — Jennifer M Anda
(74) *Attorney, Agent, or Firm* — Heber Martin Carbajal; Scott Bell

(57) ABSTRACT

A method of training, verification, and advanced notice for an autonomous system, comprising: by a machine learning classifier, wherein an adversary vehicle, and a primary vehicle are on the same path; creating a path position probability transition matrix, wherein the path position probability transition matrix comprises an acceleration parameters array of one or more acceleration parameters for a potential position, sorting a sample path, and using $N^e$ elite path; creating a samples array, wherein the sample array is one or more paths; evaluating a sample path; sorting the sample path, based at least in part a custom score of a custom score function and selecting a subset of the sample paths as $N^e$ elite paths; using the $N^e$ elite paths to update the path probability transition matrix and the acceleration parameters array; and repeating until the $N^e$ elite paths stabilizes for a predetermined number of iterations.

18 Claims, 8 Drawing Sheets

(56) References Cited

U.S. PATENT DOCUMENTS

| | | | | |
|---|---|---|---|---|
| 2017/0069214 A1* | 3/2017 | Dupray | .................... | G08G 5/56 |
| 2021/0132619 A1* | 5/2021 | Refaat | ...................... | G06N 3/09 |
| 2022/0107646 A1* | 4/2022 | Blake | ................ | B60W 60/0011 |
| 2022/0363247 A1* | 11/2022 | Hendy | ................... | G08G 1/161 |
| 2023/0179512 A1* | 6/2023 | Drusinsky | .............. | H04L 45/24 |
| | | | | 709/238 |
| 2023/0192074 A1* | 6/2023 | Abad | ................... | B60W 30/09 |
| | | | | 701/26 |

OTHER PUBLICATIONS

D. Drusinsky and J. B. Michael, "Multiagent Pathfinding Under Rigid, Optimization, and Uncertainty Constraints," in Computer, vol. 54, No. 7, pp. 111-118, Jul. 2021 (Year: 2021).*

"Carla. Open-source simulator for autonomous driving research". Accessed Mar. 24, 2023. [Online]. Available: https://carla.org/.

https://en.wikipedia.org/wiki/Confusion_matrix. Accessed Mar. 24, 2023. [Dre] Dreossi, T. et al. (2019). Verifai: A Toolkit for the Formal Design and Analysis of Artificial Intelligence-Based Systems. In: Dillig, I., Tasiran, S. (eds) Computer Aided Verification. CAV 2019. Lecture Notes in Computer Science(), vol. 11561. Springer, Cham. https://doi.org/10.1007/978-3-030-25540-4_25.

H.A Ignatious, H. El-Sayed, M. Khan, An overview of sensors in Autonomous Vehicles, Procedia Computer Science, vol. 198, 2022, pp. 736-741, ISSN 1877-0509, https://doi.org/10.1016/j.procs.2021.12.315.

S. P. Miller, Formal Methods for Critical Systems, in: Cofer, D., Fantechi, A. (eds) Formal Methods for Industrial Critical Systems. FMICS 2008. Lecture Notes in Computer Science, vol. 5596. Springer, Berlin, Heidelberg, 2009. https://doi.org/10.1007/978-3-642-03240-0_1.

A. Pnueli, "The temporal logic of programs," in 18th Annual Symposium on Foundations of Computer Science, 1977, pp. 46-57. doi: 10.1109/SFCS.1977.32.

Random Forests. https://en.wikipedia.org/wiki/Random_forest. Accessed Mar. 24, 2023.

R. Y. Rubinstein and D. P. Kroese, The Cross-Entropy Method: A Unified Approach to Combinatorial Optimization, Monte-Carlo Simulation and Machine Learning. New York: Springer-Verlag, 2004.

Unified Modeling Language, https://en.wikipedia.org/wiki/Unified_Modeling_Language. Accessed Mar. 25, 2023.

Z. Zhang, P. Arcaini, and I. Hasuo, "Constraining counterexamples in hybrid system falsification: Penalty-based approaches," in Proc. 12th Int. Symp. NASA Formal Methods, LNCS, vol. 12229, Cham, Switzerland: Springer International Publishing, 2020, pp. 401-419, doi: 10.1007/978-3-030-55754-6_24.

* cited by examiner

100

105

110

115

305

306

305

306

306

305

306

305

405

406

405

406

406

405

406

405

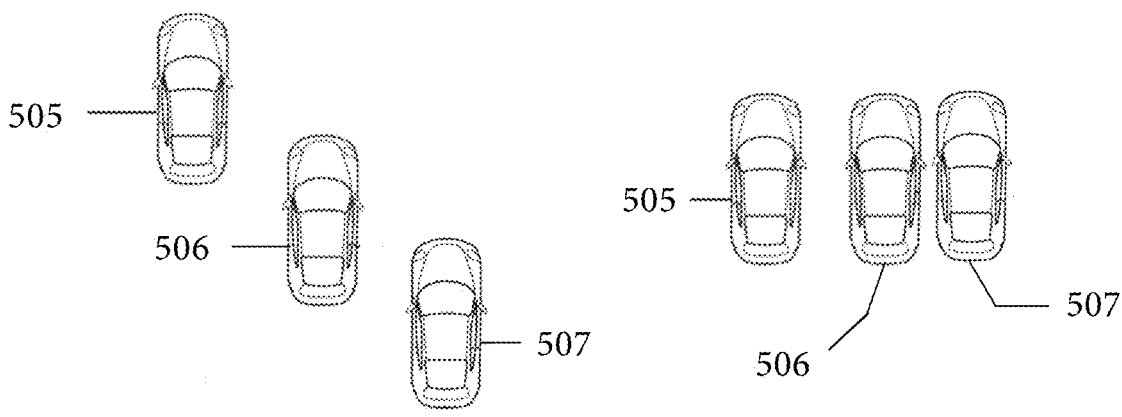
Fig. 5A
Fig. 5B
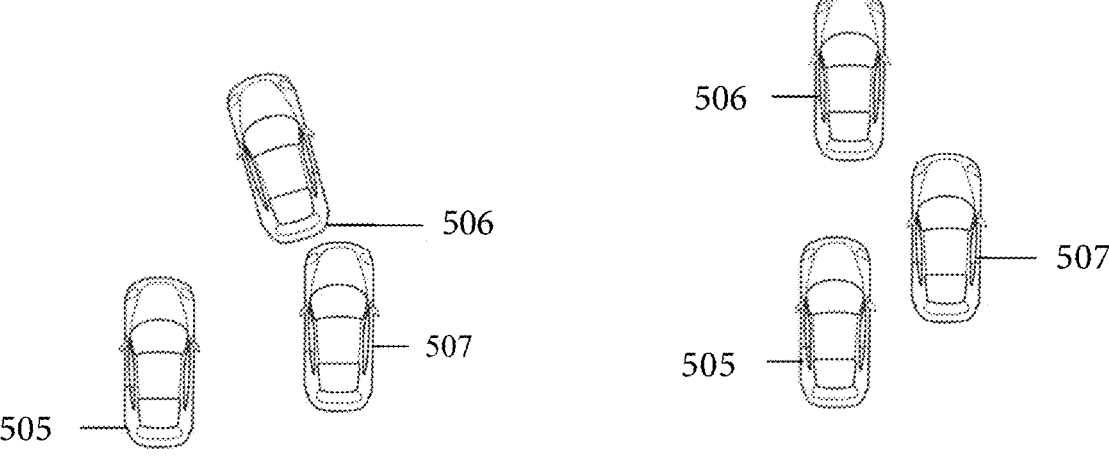
Fig. 5C
Fig. 5D

505

506

507

506

505

507

506

505

507

506

505

507

700

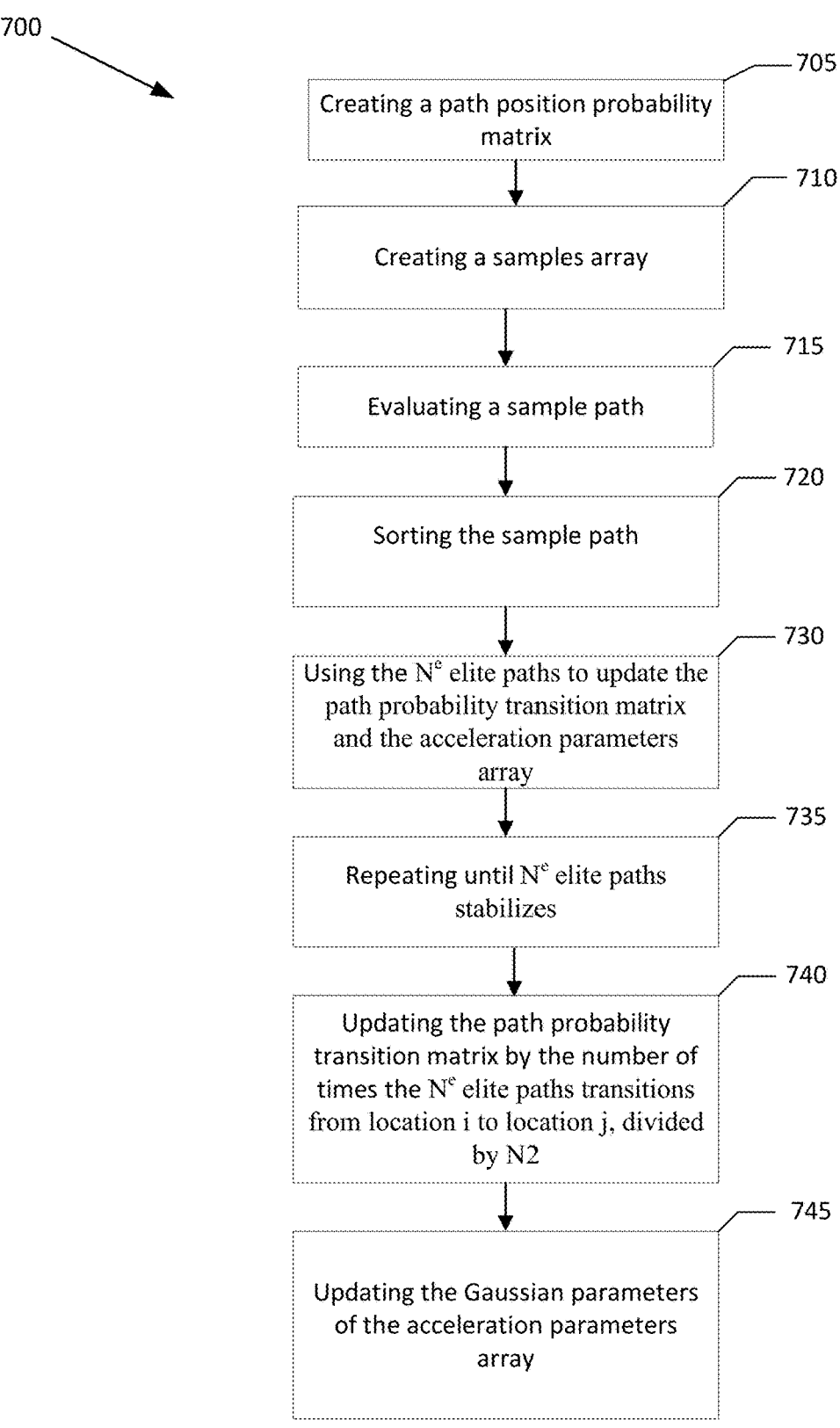

705

Creating a path position probability matrix

710

Creating a samples array

715

Evaluating a sample path

720

Sorting the sample path

730

Using the $N^e$ elite paths to update the path probability transition matrix and the acceleration parameters array

735

Repeating until $N^e$ elite paths stabilizes

740

Updating the path probability transition matrix by the number of times the $N^e$ elite paths transitions from location i to location j, divided by N2

745

Updating the Gaussian parameters of the acceleration parameters array

Fig. 7

METHOD OF MACHINE-LEARNED VERIFICATION AND ADVANCE NOTICE ORACLES FOR AUTONOMOUS SYSTEMS

CROSS-REFERENCE TO RELATED APPLICATIONS

This Patent Application takes priority from U.S. Provisional Patent Application No. 63/538,009, filed on Sep. 12, 2023, titled Machine-learned Verification and Advance Notice Oracles for Autonomous Systems, the contents of which are expressly incorporated herein by this reference as though set forth in their entirety and to which priority is claimed.

STATEMENT OF GOVERNMENT INTEREST

The present disclosure was made in the performance of official duties by one or more employees of the Department of the Navy, and thus, embodiments herein may be manufactured, used or licensed by or for the Government of the United States of America for governmental purposes without the payment of any royalties thereon or therefor.

INCORPORATION BY REFERENCE

The following publications are incorporated by reference in their entirety.

D. Drusinsky, "Run-time monitoring and recovery of Harel state charts using prioritized nondeterministic state chart specifications," in 48th Midwest Symposium on Circuits and Systems, 2005, pp. 323-326 Vol. 1

D. Drusinsky, "Formal specs can handle exceptions," CMP Embedded Developers Journal, pp. 10-14, November 2001

D. Drusinsky, Modeling and Verification Using UML State charts: A Working Guide to Reactive System Design, Run-time Monitoring and Execution-Based Model Checking, Oxford, U.K.: Elsevier Science & Technology, 2006.16

D. Drusinsky et al., Practical UML-Based Specification, Validation, and Verification of Mission-Critical Software: Space Exploration and Defense Software Examples in Practice. Carmel, IN, USA: Dog Ear Publishing, 2011.

D. Drusinsky and J. B. Michael, "Multiagent Pathfinding Under Rigid, Optimization, and Uncertainty Constraints," Computer 54 (7), 111-118. doi: 10.1 109/ MC.2021.3074264

D. Drusinsky, M. Litton, and J. B. Michael, "Lightweight verification and validation of cyberphysical systems using machine-learned correctness properties," Computer, vol. 55, no. 2, February 2022. [Online]. Available: https:// doi.org/10.1109/MC.2022.3142829

FIELD OF USE

The present disclosure relates, in general, to a method of machine-learned verification and advance notice oracles. More specifically, the present disclosure relates to a method for training and validating machine learning models of autonomous vehicles using Hybrid-Pair-Cross Entropy.

BACKGROUND

Generally, manual testing has been the prime quality software verification and assurance method for safety and mission-critical systems, comprising three primary categories of techniques: 1) theorem proving, 2) model checking, and 3) runtime monitoring.

Formal verification refers to the theory and practice of computer-supported mathematical analysis methods for ensuring correctness of software (and hardware) systems. Formal verification methods developed since the 1980s promised a superior form of verification, by mathematically proving the system under test conforms to prescribed formal specifications. Formal specifications are statements written in a language whose vocabulary, syntax, and semantics are formally defined. Executable formal specifications are requirements, written as tests of expected behavior of software under test, given a scenario that are automated. Mathematics has proven to be superior to testing in that it proves the absence of system under test specification violations rather than merely demonstrating that no such defects have been discovered so far. Several executable formal specification languages have been used for this purpose, including Linear-time Temporal Logic (Linear TL, or LTL), Metric TL (MTL), which caters for real time constraints within LTL specifications, and Statechart/StateRover assertions, a diagrammatic Unified Modeling Language (UML) specification language.

Artificial intelligence (AI)-based autonomous cyber-physical systems, such as Autonomous Vehicles (AV), Autonomous Aircraft, and Autonomous Underwater Vehicles, are increasingly using AI components such as Deep Neural Networks to make real-time control decisions. Such AI components and software cannot be modelled as a system under test (SUT) model for the purpose of heavy-weight formal verification. The one remaining formal verification technique that may potentially be used for the verification of such autonomous SUTs is runtime monitoring, which can be applied to the SUT code directly, or even to runtime log-files generated by the SUT.

Three prime categories of formal verification techniques are Theorem Proving, Model Checking, and Runtime Monitoring (RM). Theorem proving and model checking provide a complete mathematical proof of correctness with respect to the given verification oracle, or a counter example if the software does not comply with the verification oracle. Formal verification oracles, theorem proving, and model checking also require a formal representation, or model, of the system under test (SUT) to prove that the SUT conforms to its given verification oracles. Theorem proving and model checking are referred to as heavyweight formal verification. In contrast to heavyweight formal verification, runtime monitoring is a hybrid of testing and formal specifications; it checks that a SUT execution trace (e.g., in the form of a log-file) conforms to its given verification oracles. For this reason, RM is referred to as lightweight formal verification. Runtime monitoring does not require a SUT model.

AI-based, machine learned systems make real-time control decisions. These systems typically use algorithms to learn patterns from large amounts of data through an iterative process. Machine learning algorithms use computation methods to learn directly from data, instead of relying on predetermined equations.

When training a machine learning classifier, one needs a train-and-test dataset. While autonomous vehicle (AV) companies have been driving their AVs in major cities thereby collecting such data, they typically do not share that data with the public. Some other types of autonomous systems do not have such data available, as is the case for an intelligent autonomous nuclear powerplant cleanup robot, and many kinds of semi-autonomous military systems. The techniques described in this article enable the generation of ML datasets from simulations rather than from field data. Simulation-based ML datasets also can be mixed with real-life field data whenever such data becomes available.

Therefore, what is needed is a method of training and verifying AI based safety and mission-critical system.

SUMMARY

To minimize the limitations in the prior art and to minimize other limitations that will become apparent upon reading and understanding the present specification, the present disclosure discloses a new and useful method for training, verification, and advanced notice of machine learning models of autonomous vehicles using Hybrid-Pair-Cross Entropy.

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

The problem of training, verifying, and providing advanced notice for AI-based safety and mission-critical systems as a system under test can be solved by Hybrid-Cross entropy.

A machine learning classifier is an algorithm that automatically assigns data points to categories or classes. The goal of a classifier is to learn from training data and make accurate predictions on new data. Classifiers are typically used in supervised learning systems, where the correct class for each input example is known during training. Unsupervised algorithms use pattern recognition to classify unlabeled datasets, becoming more accurate over time.

A machine learning classifier may be trained, verified, and provide advance notice oracles through HybridPair Cross Entropy that may be manifested as an extension of falsification. The technique may perform the cross entropy (CE) search in a hybrid probability distribution space that consists of a plurality of random variables, each with its own probability distribution. To avoid the discovery of non-interesting scenarios, such as vehicles colliding deliberately, it may discover pairs of similar scenarios, one that satisfies a verification oracle (which may be called vanilla or 0-labeled scenario), the other (which may be called perturbation, or 1-labeled, scenario) that does not. HybridPair Cross Entropy may apply the 0-labeled and 1-labeled HybridPairs as machine learning (ML) training datasets to create ML-based VO classifiers, denoted as MLVOs.

One embodiment may be a method of training, verification, and advanced notice for an autonomous system, comprising: by a machine learning classifier, wherein an adversary vehicle, and a primary vehicle may be on the same path; creating a path position probability transition matrix, wherein the path position probability transition matrix comprises an acceleration parameters array of acceleration parameters for a potential position, wherein the path position probability transition matrix comprises equal probabilities for creating a samples array, evaluating a sample path, sorting a sample path, and using Ne elite path; creating a samples array, wherein the sample array may be paths, wherein the paths may be a sequence of grid points of a two-dimensional grid, wherein the grid points comprise: a position and an acceleration, wherein the position may be a sampled position from a probability distribution of the path probability transition matrix, and wherein the acceleration may be a sampled acceleration from an acceleration probability distribution associated with the sampled position; evaluating a sample path, wherein a custom score function asserts a potential position and a potential acceleration to identify a collision path of the perturbation-adversary and the primary vehicle, a no collision path of the adversary vehicle and the primary vehicle, a small position and acceleration distance between the adversary vehicle and the primary vehicle; sorting the sample path, based at least in part on a custom score of a custom score function and selecting a subset of the sample paths as Ne elite paths; using the Ne elite paths to update the path probability transition matrix and the acceleration parameters array; and repeating until the Ne elite paths stabilizes. Updating the path probability transition matrix by the number of times the Ne elite paths transitions from location i to location j, divided by N2; and updating Gaussian parameters pairs of the acceleration parameters array as follows:

$$\mu_i = \frac{1}{N^e} \sum_{K=0}^{N^e} accek[k, i]$$

$$\sigma_i^2 = \frac{1}{N^e} \sum_{k=0}^{N^e} (\mu_i - accel[k, i])^2$$

wherein accel[k, i] may be the acceleration in cell i of the two-dimensional grid according to a k elite path. The custom score function prioritizes a high priority sample path as a slight deviation from a non-colliding path that result in a collision in the Ne elite paths; wherein the custom score function prioritizes successively different colliding or non-colliding paths to generate a high-variance dataset; and wherein the high-variance data set trains a machine learning model. An independent adversary vehicle, wherein the independent adversary vehicle, the vanilla adversary vehicle, the adversary vehicle, and the primary vehicle may be on the same path; and wherein the custom score function asserts a potential position and a potential acceleration to identify a no collision between the adversary vehicle and the independent adversary vehicle, and a small position and acceleration distance between the adversary vehicle and independent adversary vehicle. The sample paths of the independent adversary vehicle and the primary vehicle should not collide. Realistic scenarios may be simulated from autonomous vehicle reporting databases. Random sample paths may be added to the high-variance dataset; and wherein the random sample paths represent naturalistic paths. Dissimilar collision and non-collision paths contribute to model robustness.

An alternate embodiment may be a system for training, verifying, and providing advance notice, the system comprising a non-transitory computer readable medium storing instruction executable by a processor, wherein the instructions comprise instructions to: by a machine learning classifier, wherein an adversary vehicle, and a primary vehicle may be on the same path; creating a path position probability transition matrix, wherein the path position probability transition matrix comprises an acceleration parameters array of acceleration parameters for a potential position, wherein the path position probability transition matrix comprises equal probabilities for creating a samples array, evaluating a sample path, sorting a sample path, and using Ne elite path; creating a samples array, wherein the sample array may be paths, wherein the paths may be a sequence of grid points of a two-dimensional grid, wherein the grid points comprise: a position and an acceleration, wherein the position may be a sampled position from a probability distribution of the path probability transition matrix, and wherein the acceleration may be a sampled acceleration from an acceleration probability distribution associated with the sampled position; evaluating a sample path, wherein a custom score function asserts a potential position and a potential acceleration to identify a collision path of the adversary vehicle and the primary vehicle, a no collision path of adversary vehicle and the primary vehicle, a small position and acceleration distance between the adversary vehicle and primary vehicle; sorting the sample path, based at least in part a custom score of a custom score function and selecting a subset of the sample paths as Ne elite paths; using the Ne elite paths to update the path probability transition matrix and the acceleration parameters array; and repeating until the Ne elite paths stabilizes. Updating the path probability transition matrix by the number of times the Ne elite paths transitions from location i to location j, divided by N2; and updating Gaussian parameters pairs of the acceleration parameters array as follows:

$$\mu_i = \frac{1}{N^e} \sum_{K=0}^{N^e} accek[k, i]$$

$$\sigma_i^2 = \frac{1}{N^e} \sum_{k=0}^{N^e} (\mu_i - accel[k, i])^2$$

wherein accel[k, i] may be the acceleration in cell i of the two-dimensional grid according to a k elite path. The custom score function prioritizes a high priority sample path as a slight deviation from a non-colliding path that result in a collision in the Ne elite paths; wherein the custom score function prioritizes successively different colliding or non-colliding paths to generate a high-variance dataset; and wherein the high-variance data set trains a machine learning model. An independent adversary vehicle, wherein the independent adversary vehicle, the primary vehicle, and the adversary vehicle may be on the same path; and wherein the custom score function asserts a potential position and a potential acceleration to identify a no collision between adversary and independent adversary vehicles, and a small position and acceleration distance between adversary vehicle and independent adversary vehicle. The sample paths of the independent-adversary and the primary vehicle should not collide. Realistic scenarios may be simulated from autonomous vehicle reporting databases. Random sample paths may be added to the high-variance dataset; and wherein the random sample paths represent naturalistic paths. Dissimilar collision and non-collision paths contribute to model robustness.

Another embodiment may be a Hybrid-Pair-Cross Entropy method of training, verification, and advanced notice for an autonomous system, the method comprising: by an adversary vehicle and a primary vehicle, wherein the adversary vehicle, and the primary vehicle may be on the same path; creating a path position probability transition matrix, wherein the path position probability transition matrix comprises an acceleration parameters array of acceleration parameters for a potential position, wherein the path position probability transition matrix comprises equal probabilities for creating a samples array, evaluating a sample path, sorting a sample path, and using Ne elite path; creating a samples array, wherein the sample array may be paths, wherein the paths may be a sequence of grid points of a two-dimensional grid, wherein the grid points comprise: a position and an acceleration, wherein the position may be a sampled position from a probability distribution of the path probability transition matrix, and wherein the acceleration may be a sampled acceleration from an acceleration probability distribution associated with the sampled position; evaluating a sample path, wherein a custom score function asserts a potential position and a potential acceleration to identify a collision path of the perturbation-adversary and the primary vehicle, a no collision path of adversary vehicle and the primary vehicle, a small position and acceleration distance between adversary and primary vehicle, wherein the custom score function prioritizes a high priority sample path as a slight deviation from a non-colliding path that result in a collision in the Ne elite paths, wherein the custom score function prioritizes successively different colliding or non-colliding paths to generate a high-variance dataset, wherein the high-variance data set trains a machine learning model; sorting the sample path based on a corresponding score from the custom score function and selecting a subset of the sample paths as Ne elite paths; using the Ne elite paths to update the path probability transition matrix and the acceleration parameters array; repeating until the Ne elite paths stabilizes for a predetermined number of iterations; updating the path probability transition matrix by the number of times the Ne elite paths transitions from location i to location j, divided by N2; updating Gaussian parameters pairs of the acceleration parameters array as follows:

$$\mu_i = \frac{1}{N^e} \sum_{K=0}^{N^e} accek[k, i]$$

$$\sigma_i^2 = \frac{1}{N^e} \sum_{k=0}^{N^e} (\mu_i - accel[k, i])^2$$

wherein accel[k, i] may be the acceleration in cell i of the two-dimensional grid according to a k elite path; wherein the custom score function prioritizes a high priority sample path as a slight deviation from a non-colliding path that result in a collision in the Ne elite paths; wherein the custom score function prioritizes successively different colliding or non-colliding paths to generate a high-variance dataset; and wherein the high-variance data set trains a machine learning model. An independent adversary vehicle, wherein the independent adversary vehicle, the adversary vehicle, and the primary vehicle may be on the same path; and wherein the custom score function asserts a potential position and a potential acceleration to identify a no collision between the adversary vehicle and independent adversary vehicle, and a small position and acceleration distance between the adversary vehicle and the independent adversary vehicle. The sample paths of the independent adversary vehicle and the primary vehicle should not collide. Realistic scenarios may be simulated from autonomous vehicle reporting databases; and wherein dissimilar collision and non-collision paths contribute to model robustness.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIG. 5A-5H are illustrations of vanilla and perturbation scenarios for an independent adverse vehicle acting on an adverse vehicle.

FIG. 7 is a process flow block diagram of one embodiment of a method of verification and advanced notice for an autonomous system.

DETAILED DESCRIPTION OF THE ILLUSTRATIVE EMBODIMENTS

Figure 1:
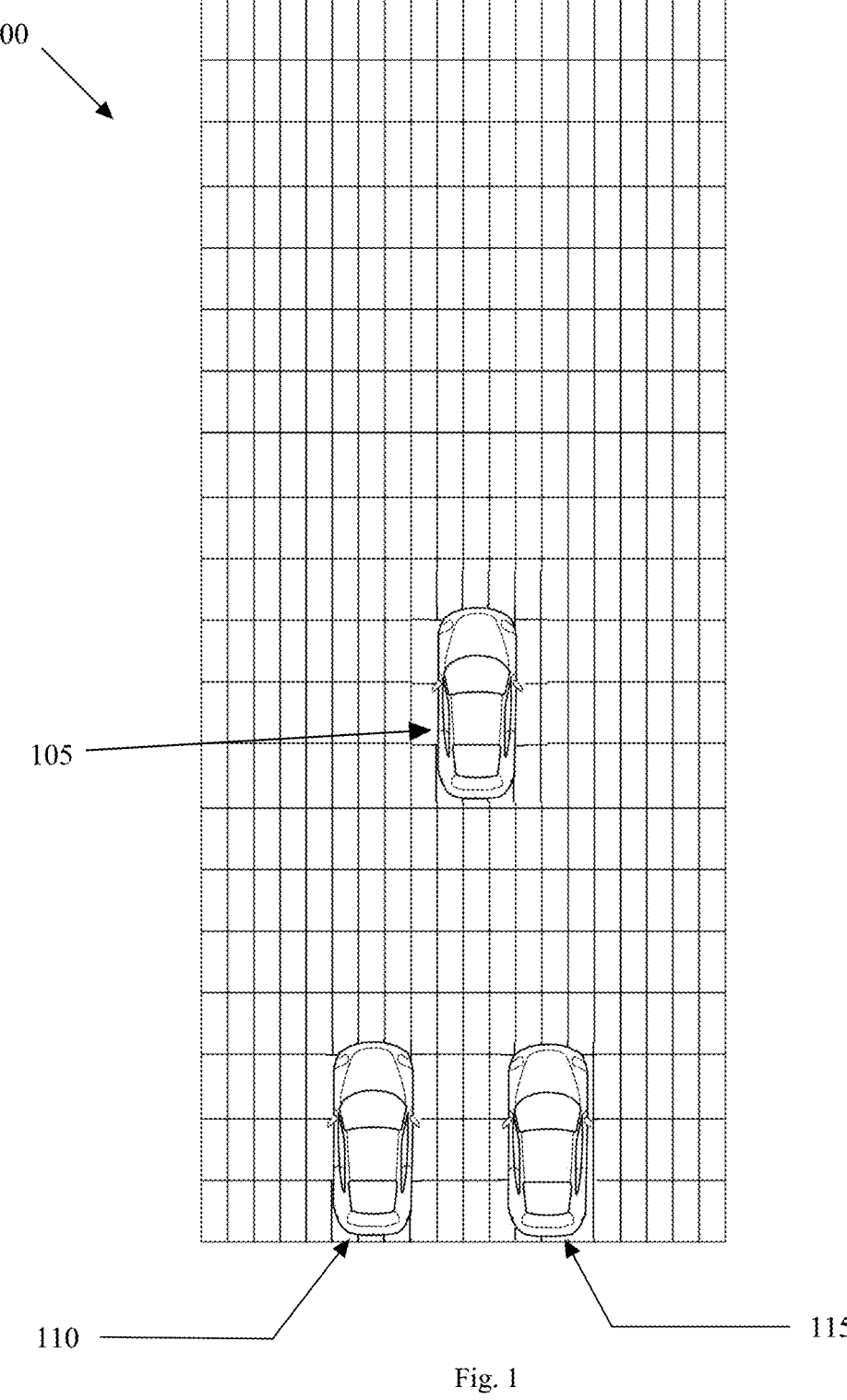
FIG. 1 is an illustration of an autonomous vehicle simulation domain.

In the following detailed description of various embodiments of the present disclosure, numerous specific details are set forth in order to provide a thorough understanding of various aspects of one or more embodiments of the present disclosure. However, one or more embodiments of the present disclosure may be practiced without some or all of these specific details. In other instances, well-known methods, procedures, and/or components have not been described in detail so as not to unnecessarily obscure aspects of embodiments of the present disclosure.

While multiple embodiments are disclosed, still other embodiments of the devices, systems, and methods of the present disclosure will become apparent to those skilled in the art from the following detailed description, which shows and describes illustrative embodiments of the devices, systems, and methods of the present disclosure. As will be realized, the devices, systems, and methods of the present disclosure are capable of modifications in various obvious aspects, all without departing from the spirit and scope of the present disclosure. Accordingly, the screenshot figures, and the detailed descriptions thereof, are to be regarded as illustrative in nature and not restrictive. Also, the reference or non-reference to a particular embodiment of the devices, systems, and methods of the present disclosure shall not be interpreted to limit the scope of the present disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Furthermore, the one or more versions may be implemented as a method, apparatus, or article of manufacture using standard programming and/or engineering techniques to produce entirely hardware embodiment, an entirely software embodiment, or an embodiment combining software and hardware embodiments. Furthermore, the systems and methods may take the form of Non-transitory computer readable media. More particularly, the present methods and systems may take the form of web-implemented computer software or a computer program product. Any suitable computer-readable storage medium may be utilized including, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick).

Those skilled in the art will recognize many modifications may be made to this configuration without departing from the scope of the disclosed embodiments.

Embodiments of the systems and methods are described below with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of the various embodiments of the device, method, and/or system. For example, as used herein, the terms "computer" and "computer system" generally refer to any device that processes information with an integrated circuit chip and/or central processing unit (CPU).

As used herein, the terms "software" and "application" refer to any set of machine-readable instructions on a machine, web interface, and/or computer system" that directs a computer's processor to perform specific steps, processes, or operations disclosed herein.

As used herein, the term "computer-readable medium" refers to any storage medium adapted to store data and/or instructions that are executable by a processor of a computer system. The computer-readable storage medium may be a computer-readable non-transitory storage medium and/or any non-transitory data storage circuitry (e.g., buggers, cache, and queues) within transceivers of transitory signals. The computer-readable storage medium may also be any tangible computer readable medium. In various embodiments, a computer readable storage medium may also be able to store data, which is able to be accessed by the processor of the computer system.

As used herein, the term "classifier" or "machine learning classifier" refers to an algorithm that automatically orders or categorizes data into one or more of a set of "classes."

As used herein, the term "cross entropy" or "logarithmic loss" refers to a loss function used in machine learning to measure the performance of a classification model. Namely, it measures the difference between the discovered probability distribution of a classification model and the predicted values.

As used herein, the term "cyber-physical system" refers to a computing system that connects the physical and virtual worlds by combining physical processes with computational algorithms and networked sensors.

As used herein, the term "executable specification" or "verification Oracle" are requirements written as tests of the expected behavior of the software under test given an automated scenario.

As used herein, the term "falsification" refers to the runtime monitoring-based technique for discovering scenarios in which the system under test violates verification oracles As used herein, the term "formal verification" refers to a testing technique that uses mathematical models to check that a system's behavior matches a given property As used herein, the term "machine learning dataset" refers to a collection of data pieces that a computer can treat as a single unit for analytic and prediction purposes.

As used herein, the term "model checking" refers to a rigorous validation technique used to ensure that a model satisfies specified requirements, such as safety and correctness properties.

As used herein, the term "Monte Carlo experimentation" refers to using simulated random numbers to estimate some functions of a probability distribution.

As used herein, the term "perturbation path" refers to a path that causes a collision.

As used herein, the term "probability distribution" refers to the mathematical function that gives the probabilities of occurrence of possible outcomes for an experiment. It is a mathematical description of a random phenomenon in terms of its sample space and the probabilities of events (subsets of the sample space)

As used herein, the term "runtime monitoring" refers to a lightweight and dynamic verification technique that involves observing the internal operations of a software system.

As used herein, the term "stabilize" refers to when cross entropy can no longer be improved by continuing, and therefore stops.

As used herein, the term "theorem proving" or "proof-based methods" refers to a verification method that uses mathematical logic and automated intellectual to explore logical derivations of a theory As used herein, the term "training" refers to the iterative process that involves building a machine learning classifier by training it on a set of examples rather than programming it explicitly As used herein, the term "vanilla path" refers to a path that satisfies a verification oracle.

HybridPair Cross Entropy may be manifested as an extension of Falsification. The technique may perform the cross entropy (CE) search in a hybrid probability distribution space that consists of a plurality of random variables, each with its own probability distribution. To avoid the discovery of non-interesting scenarios, such as vehicles colliding deliberately, it may discover pairs of similar scenarios, one that satisfies the verification oracle (VO) (which may be called vanilla or 0-labeled scenario), the other (which may be called perturbation, or 1-labeled, scenario) that does not. HybridPair Cross Entropy may apply the 0-labeled and 1-labeled HybridPairs as machine learning (ML) training datasets to create ML-based VO classifiers, denoted as MLVOs.

FIG. 1 is an illustration of an autonomous vehicle simulation domain. Two-dimensional grid domain 100 may comprise a 20×20 grid with primary vehicle 105, independent adversary vehicle 115 and adversary vehicle 110.

In one embodiment, two-dimensional grid domain 100 can have but is not limited to any number of vehicles, number of lanes, and weather chosen for the simulation. Primary vehicle 105 is preferably an ideal autonomous vehicle, with an onboard artificial intelligence (AI) that controls primary vehicle 105 to a pre-programmed destination. The AI preferably controls primary vehicle 105 while avoiding collisions with adversary vehicle 110 and other simulation vehicles. Independent adversary vehicle 115 and adversary vehicle 110 may be separate and not assumed to be autonomous or intelligent vehicles. Independent adversary vehicle 115 and adversary vehicle 110 are independently modeled in two-dimensional grid domain 100. Adversarial vehicle 110 may be a vehicle that potentially collides with primary vehicle 105, according to collision scenarios discovered by a cross-entropy falsifier. Not only adversary vehicle 110 collision path but also a vanilla path and perturbation path, pair of similar adversarial paths such that the vanilla path does not collide with primary vehicle 105 while the perturbation path does collide with primary vehicle 105. Independent adversary vehicle 115 preferably does not collide with primary vehicle 105 or with adversary vehicle 110 but is added to model a third-party vehicle that may influence adversary vehicle 110 to collide with primary vehicle 105 by encroaching on the path of adversary vehicle 110.

In one embodiment, the two-dimensional grid domain 100 may be superimposed on a road or map. Each grid cell may preferably be 0.8 m wide and 5 m long, which resembles the size of a regular family sedan and one-quarter the width of a typical road lane.

Generic Cross Entropy Search: incorporated reference [4] describes the application of cross-entropy (CE) search to "Multiagent Pathfinding Under Rigid, Optimization, and Uncertainty Constraints." Listing 1 contains the pseudocode for that generic CE method; it discovers paths that best satisfy rigid, optimization, and uncertainty types of constraints. In the generic CE method, paths—sequences of positions in a two-dimensional grid- are created by sampling from a corresponding sequence of categorical distributed random variables. In other words, the CE method of [7] finds the best constraint-satisfying path in terms of its positional steps within a two-dimensional grid.

The algorithm uses a transition probability matrix called Mat, whose size is n*m, where m is the number of possible maneuvers, or actions, that result in a certain path position at step k+1 (path[k+1]) given its position at step k (path[k]). When using a 2D grid representation of the underlying domain-of-discourse roadway (FIG. 1), n is preferably the grid's size (width times height as discussed in the previous section), and m=8, 5, or 3 may be used. When m=8, it means that the possible adjacent locations to consider for the next step along the path can be any one of eight possible locations adjacent to the adjacent location (that is, three above, three below, and the two sides of the current location). When m=5, those possible next-step locations are the three locations above and the two locations on the sides of the current location. When m=3, those possible next-step locations are the three locations above the current location. This is the post-typical setting for AV in a typical US roadway where cars only move forward. Mat[i] contains the probability distribution for transitioning from cell/location i to its m adjacent cells.

Listing 1:

1. Create the path probability transition matrix Mat. Initialize matric Mat with equal probabilities for all the possible next steps. Initialize an iteration counter t=0. Let $N^e = \rho*N$, where the variable $\rho$ is a small fraction such as 0.01.

2. Create an array of N paths called samples. Each sample path is a sequence of points created stochastically by sampling from the probability distribution contained in Mat, where N is typically 1-10 times larger than n. The source position is always path[0]; after that, path[j], j=1, 2, . . . , is the position attained as a result of one of m possible maneuvers; it is drawn probabilistically from the Mat[path[j]]m-categories distribution.

3. Evaluate each path in paths using a custom score function, CE's equivalent of a specification. Smaller numbered scores are considered to be superior to larger numbered scores. A negative score means the path conforms to all the rigid constraints, whereas a non-negative score value means the path is inadmissible; for example, an Adv path that is expected to collide with primary vehicle 105 will be scored with a negative score if and only if that path indeed collides with primary vehicle 105. The lower the score, the more the path conforms to the governing optimization and uncertainty constraints.

4. Sort paths by their ascending score. The first $N^e$ paths of the sorted list (i.e., the best paths according to their score) are called the elite set of sample paths. Terminate if paths[$N^e$] has not changed in the last d iterations (for example, d=4) and declare paths[0] as the best path.

5. Use the $N^e$ elite paths to update Mat using standard frequency counting, that is, Mat[i,j]=number of times any path of the elite set transitioned from location i to location j, divided by $N^e$.

6. Increment t and go to step 2. Listing 1. Pseudocode for the generic CE search Algorithm Note: matrix Mat contains categorically distributed random variables, one for each grid cell[i,j] of the grid, $i \in [0,n)$, $j \in [0,m)$, then step 5 performs a counting based probability update for each matrix Mat[i,j], using the elite set computed in step 4. When modeling Normally distributed random variables, the probability update mechanism is not counting-based but uses normal distribution parameter update formulas instead.

Figure 2:
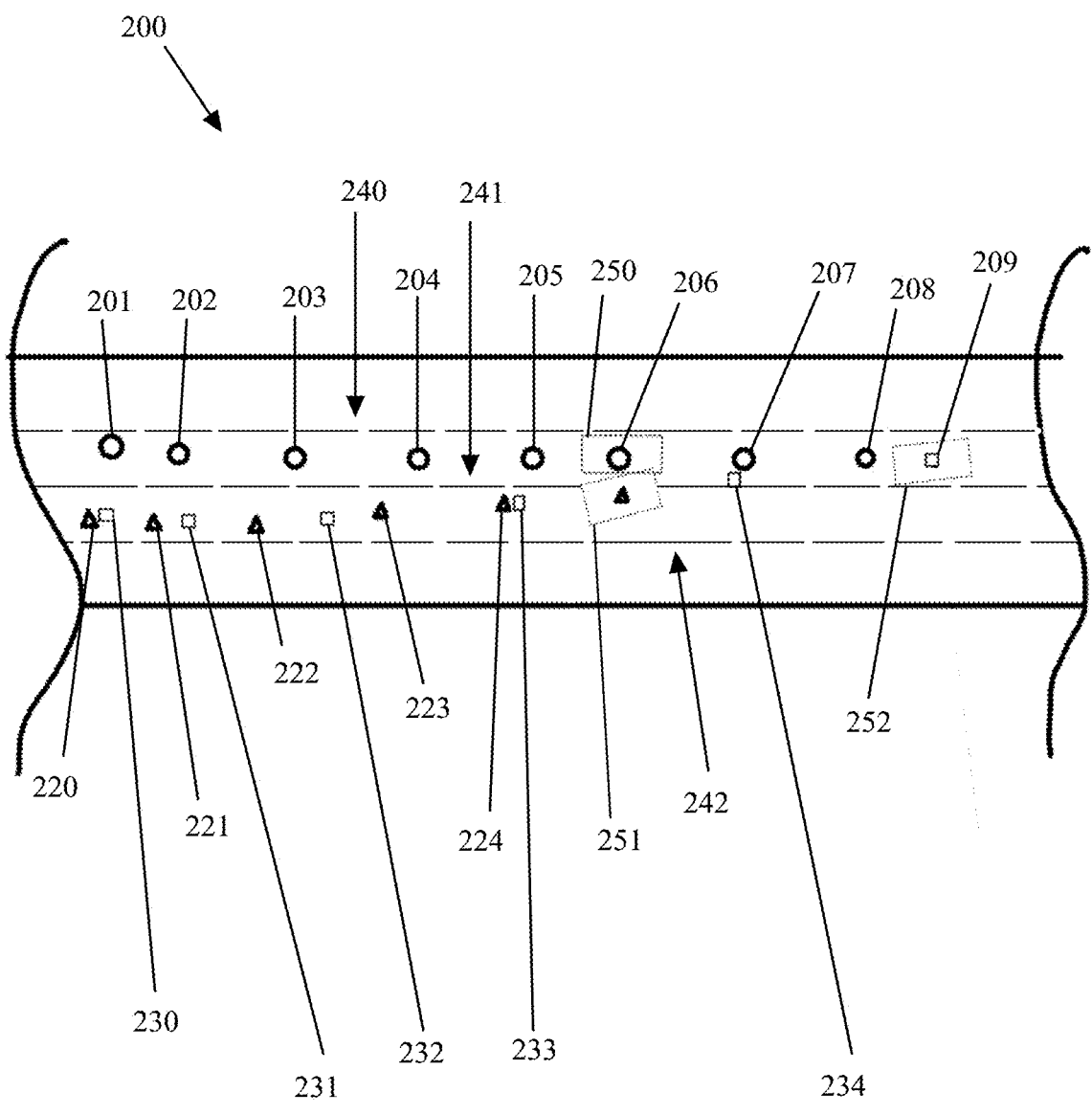
FIG. 2 is an illustration of a HybridPair Cross-Entropy search for collision scenarios.

FIG. 2 is an illustration of a HybridPair Cross-Entropy search for collision scenarios. HybridPair cross entropy search for collision scenario 200 may include a primary vehicle path that comprises 201, 202, 203, 204, 205, 206, 207, 208, and 209; a vanilla path that comprises 230, 231,232, 233, 234, and 235; a perturbation path that comprises 220, 221, 222, 223, and 224; outside lane divider 240, middle lane divider 241, inner lane divider 242, and vehicle collision boundary 250, 251, and 252. Primary vehicle path 201, 202, 203, 204, 205, 206,207, 208, and 209 may be represented by time and speed. Vanilla path 230, 231, 232, 233, 234, and 235 may be represented by time and speed. Perturbation path 220, 221,222, 223, and 224 may be represented by time and speed. Time is preferably measured from the start of a sequence. Vanilla path 230,231, 232, 233, 234, and 235 and perturbation path 220, 221, 222, 223, and 224 are preferably similar in both categorically distributed value (position) and normally distributed value (speed). As shown in FIG. 2, perturbation path 220, 221, 222, 223, and 224 collides with primary vehicle path 201, 202,203, 204, 205, 206, 207, 208, and 209 As shown in FIG. 2 vanilla path 230, 231, 232, 233,234, and 235 does not collide with primary vehicle path 201,202, 203, 204, 205, 206, 207, 208, and 209. It is preferable that vehicle collision boundaries 250 and 251 be labeled a 1 showing a collision. Vehicle collision boundary 252 is preferably labeled a 0, showing no collision.

Hybrid CE-search: The generic CE search method finds constraint-satisfying paths. A path is but a sequence of positions within a two-dimensional grid of size n. Step 2 of Listing 1 creates N sample paths sampling from the probability distribution contained in matrix Mat. A corresponding sequence of acceleration (or speed) values, i.e., path[k], k=0, 1, . . . may consist of both the position and the acceleration in that step. Assuming acceleration is normally distributed and therefore maintains normally distributed random variables. In addition to the n×m transition-probability matrix Mat[i,j] used in Listing 1, an additional size n array called GP, containing Gaussian parameter pairs (μ,σ2), one for each cell of the grid. Listing 1 is modified in steps 2, 4, and 5 accordingly, resulting in Listing 2.

1. Execute step 1 of Listing 1. Create GP, an initial array of size n of normally distributed parameters. Initialize an iteration counter t=0.

2. Create an array of N paths called samples. Each sample path is a sequence of points that encapsulates a grid position (denoted as pos) according to step 2 of Listing 1, as well as an acceleration value indicating the acceleration in pos. The acceleration value is stochastically generated by sampling from the probability distribution contained in GP[pos].

3. Evaluate each path in paths using the custom score function, which can now assert about both position and acceleration.

4. Sort paths by their score. Terminate as in step 4 of in Listing 1, and likewise declare paths[0] as the best path.

5. Use the $N^e$ elite paths to update both matrix Mat (see step 5 of Listing 1), and GP. For GP: use the $N^e$ elite paths to update the Gaussian parameters pairs ($\mu_i$, $\sigma_i^2$) of GP[i], i∈ [0,n), as follows:

$$\mu_i = \frac{1}{N^e} \sum_{K=0}^{N^e} accel[k, i]$$

$$\sigma_i^2 = \frac{1}{N^e} \sum_{K=0}^{N^e} (\mu_i - accel[k, i])^2$$

Where accel[k, i] is the acceleration in cell i of the grid according to the k'th elite path.

6. Increment t and go to step 2. Listing 2 Pseudocode for the Hybrid CE search Algorithm Therefore, the hybrid aspect of the HybridPair method is generic CE Listing 1 applied to a hybrid of random variable families.

Pair CE-search: the CE search ideally discovers paths that enjoy two properties: 1. discover interesting colliding adverse paths. An example of a non-interesting adverse path is where adversary vehicle 110 deliberately swerves into primary vehicle 105 with no advanced warning behavior; this scenario is non-interesting because there is nothing that can be done to warn or prepare primary vehicle 105. Because primary vehicle 105 cannot be warned or prepared for such action, only adverse paths that, although collide with primary vehicle 105 (i.e., "bad"), are also only slight deviations from an otherwise non-colliding (i.e., "good"). Slight deviations may also be small position and acceleration distances. Therefore, only searches for pairs of (vanilla ("good"), perturbation ("bad")) adverse paths where the vanilla and perturbation paths differ in a slight modification of their parameters, such as visiting slightly different position(s) along their respective path or traveling with slightly different acceleration (or speed) values along some of their respective path positions.

Figure 3A:
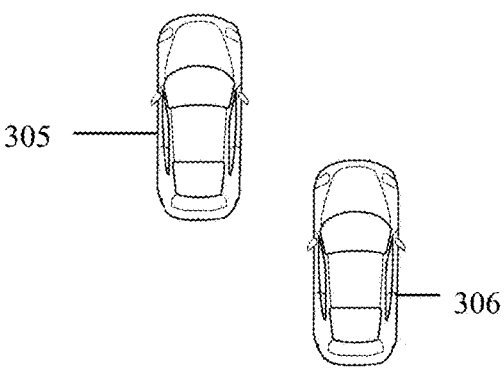
FIG. 3A-3D are illustrations of a vanilla scenario of a primary vehicle and an adverse vehicle.
Figure 3B:
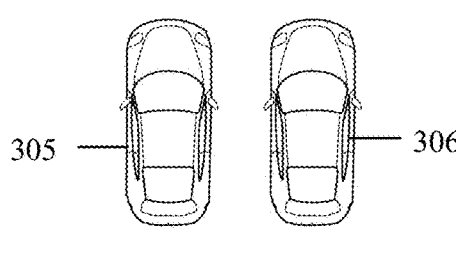
Figure 3C:
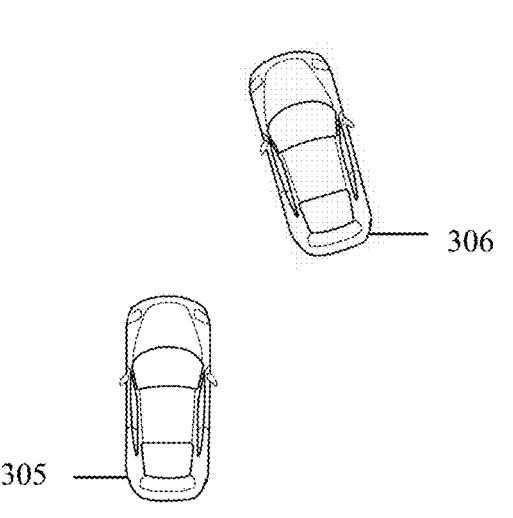
Figure 3D:
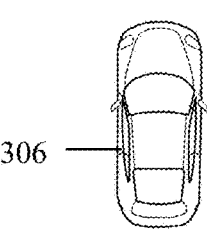
Figure 3D:
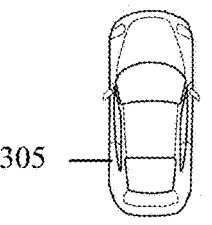

FIG. 3A-3D are illustrations of a vanilla scenario of a primary vehicle and an adverse vehicle. Primary vehicle 305 is on a path, and adverse vehicle 306 is on a path. As shown in FIG. 3A, adversary vehicle 306 may be but is not limited to, being modeled from a passenger-side rear at a first-time acceleration. As shown in FIG. 3B, adversary vehicle 306 may proceed to pass primary vehicle 305 on the right side at a second time and acceleration. As shown in FIG. 3C, adversary vehicle 306 passes primary vehicle 305 at a third time and acceleration and begins to merge into the projected path of primary vehicle 305 but does not collide with primary vehicle 305. As shown in FIG. 3D, adversary vehicle 306 is on the same path as primary vehicle 305 at a fourth time and acceleration with no collision or potential collision.

Figure 4A:
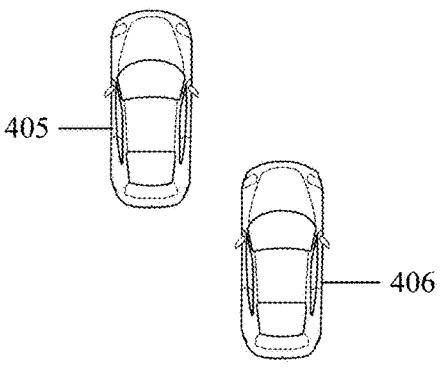
FIG. 4A-4D are illustrations of perturbation scenarios for an adverse vehicle with vanilla paths.
Figure 4B:
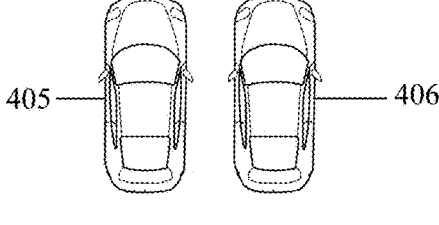
Figure 4C:
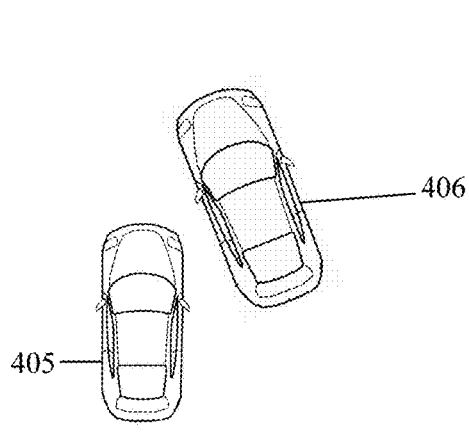
Figure 4D:
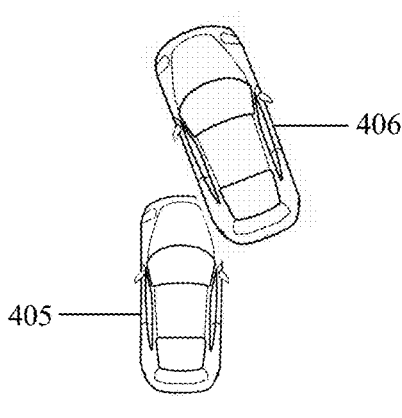

FIG. 4A-4D are illustrations of a perturbation scenario for an adverse vehicle with vanilla paths. Primary vehicle 405 is on a path, and adverse vehicle 406 is on a path. As shown in FIG. 4A, adversary vehicle 406 may be but is not limited to, being modeled from a passenger-side rear at a first-time acceleration. As shown in FIG. 4B, adversary vehicle 406 may proceed to pass primary vehicle 405 on the right side at a second time and acceleration. As shown in FIG. 4C, adversary vehicle 406 passes primary vehicle 405 a third time and acceleration and begins to merge into the projected path of primary vehicle 405 but does not collide with primary vehicle 405. As shown in FIG. 4D, adversary vehicle 406 is in the same path as primary vehicle 405 at a fourth time and acceleration with no collision or potential collision.

For FIGS. 3A-3D and FIGS. 4A-4D, note that (vanilla path, perturbation path) pair of scenarios are for the same adversary vehicle 306 and 406. However, two slightly different behaviors of the same vehicle where the perturbation behavior results in a collision with primary vehicle 405 and the vanilla does not result in a collision with primary vehicle 306.

Discovered paths provide non-trivial information for verification and validation (V&V) and machine learning verification oracle (MLVO) training. For example, vanilla or good paths that provide information are adverse paths that persistently for ten seconds in front of primary vehicle 405 and in a different lane or path. In contrast, (vanilla ("good"), perturbation ("bad") pairs form an abstract boundary line between similar good and bad paths.

In training an MLVO classifier, vanilla paths are classified as 0-labeled observations and perturbation paths are classified as 1-labeled observations.

The CE search for (vanilla path, perturbation path) pairs is preferably implemented as two distinct CE searches, one for vanilla and one for perturbation. Their dependencies are preferably enforced in their respective score functions.

Intra and Inter-path constraints in Pair CE-search: the score function primarily manifests constraints as a continuous score value where: (i) for rigid fail/pass constraints, a negative value indicates pass, while positive indicates fail, and (ii) for an optimization constraint, such as "vehicle A should be as close as possible to vehicle B," a lower value represents better conformance.

Listing 3: provides the constraints for vanilla paths, while performing its CE (vanilla-CE).

1. Vanilla path should not collide with primary vehicle 305.
2. Vanilla speed along its path should not exceed 160 kmh.
3. Vanilla CE should preferably shorten the discovered path from a start point to adversary vehicle 306 destination.
4. Vanilla path is preferably as close as possible to perturbation path, using an acceptable distance, denoted dist(vanilla, perturbation), metrics that includes both categorically distributed data (positions along the respective paths) and normally distributed data (acceleration or speed in those positions).

Note: the first two constraints for the vanilla paths are preferably rigid constraints with the remaining constraints being optimization constraints. The constraints for perturbation paths are preferably the same as listing 3, except for constraint where perturbation path must collide with primary vehicle 405.

Note: adversary vehicle 306 and adversary vehicle 406 are not two separate vehicles; rather, they are the similar paths for the same vehicle where one is required to collide with primary vehicle 405 and the other does not collide with primary vehicle 305.

FIG. 5A-5H are illustrations of vanilla and perturbation scenarios for an independent adverse vehicle acting on an adverse vehicle. Primary vehicle 505 is on a path, adverse vehicle 506 is on a path, and independent adverse vehicle 507 is on a path.

A vanilla path is shown in FIG. 5A-5D: as shown in FIG. 5a, independent adversary vehicle 507 is modeled from the rear passenger side of adversary vehicle 506 and is further modeled from the rear passenger side of primary vehicle 505 at a first time and acceleration. As shown in FIG. 5B, independent adversary vehicle 507 may proceed closer to adversary vehicle 506. To avoid a collision with independent adversary vehicle 507, Adversary vehicle 506 is forced to proceed toward primary vehicle 505 on the right side at a second time and acceleration. As shown in FIG. 5C, adversary vehicle 506 may attempt to avoid a collision with independent adversary vehicle 507 and try to pass primary vehicle 505 at a third time and acceleration and begin to merge into the projected path of primary vehicle 505 but does not collide with primary vehicle 505. As shown in FIG. 5D, independent adversary vehicle 507 in the original path of adversary vehicle 506 and adversary vehicle 506 in the same path as primary vehicle 505 at a fourth time and acceleration with no collision or potential collision.

Figures 5E, 5F, 5G, 5H:
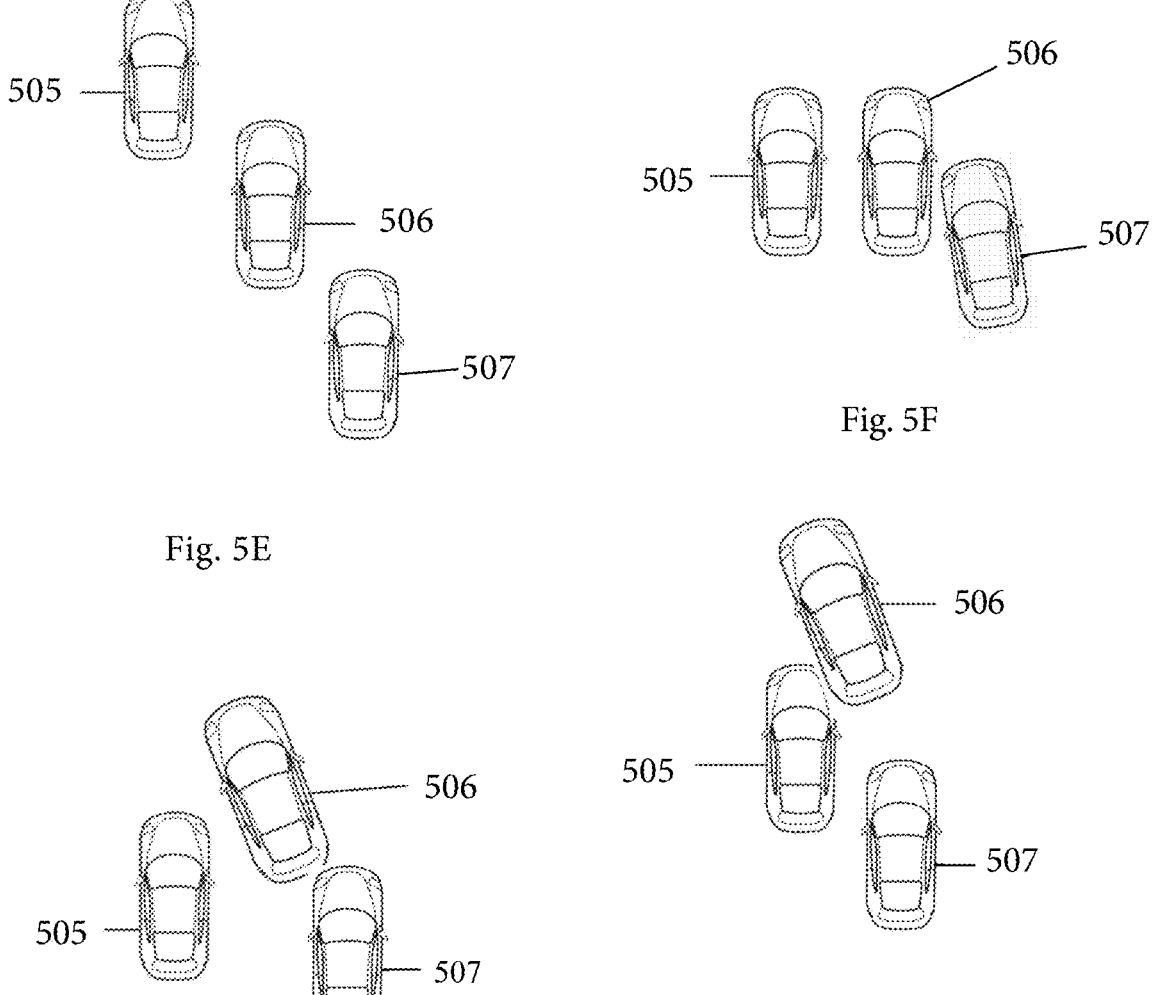

A perturbation path is shown in FIG. 5E-5H: as shown in FIG. 5E, independent adversary vehicle 507 is modeled from the rear passenger side of adversary vehicle 506, is further modeled from the rear passenger side of primary vehicle 505 at a first time and acceleration. As shown in FIG. 5F, independent adversary vehicle 507 may proceed closer to adversary vehicle 506. To avoid a collision with independent adversary vehicle 507, Adversary vehicle 506 is forced to proceed toward primary vehicle 505 on the right side at a second time and acceleration. As shown in FIG. 5G, adversary vehicle 506 attempts to avoid a collision with independent adversary vehicle 507 and attempts to pass primary vehicle 505 at a third time and acceleration and begins to merge into the projected path of primary vehicle 505. As shown in FIG. 5H, adversary vehicle 506 collides with primary vehicle 505 at a fourth time and acceleration.

HybridPair CE-Search with Additional Actors: Hybrid-Pair discovers explainable and interesting paths in which an adversary vehicle 506 collides with primary vehicle 505. The HybridPair may be enhanced by including another moving vehicle, independent adversary vehicle 507; independent adverse vehicle 507 does not directly collide with primary vehicle 505 but contributes to a collision between adverse vehicle 506 and primary vehicle 505 by encroaching into the path of adverse vehicle 506, by causing adverse vehicle 506 to avoid a collision with independent adverse vehicle 507. HybridPair CE-Search with Additional Actors provides for three searches, two for adverse vehicle 506 (vanilla and perturbation) and one for independent adverse vehicle Listing 4 provides the constraints for independent adverse vehicle 507 while performing its CE (IndAdv-CE).

1. Independent adverse vehicle 507 path should not collide with primary vehicle 505.
2. Independent adverse vehicle 507 path should not collide with adverse vehicle 506 perturbation path of Adv (perturbation path may be augmented).
3. Independent adverse vehicle 507 speed along its path should not exceed 160 kmh.
4. IndAdv-CE should strive to shorten the discovered path from a start point to its destination.
5. Vanilla path should strive to be as close as possible to perturbation path of adverse vehicle 506 prior to the perturbation-primary vehicle 505 collision point, using the same metric used in constraint #5 of listing 3.

Note: Listing 4. The first three constraints for the path of independent adverse vehicle 507 are rigid and the remaining are optimization constraints.

Figure 6:
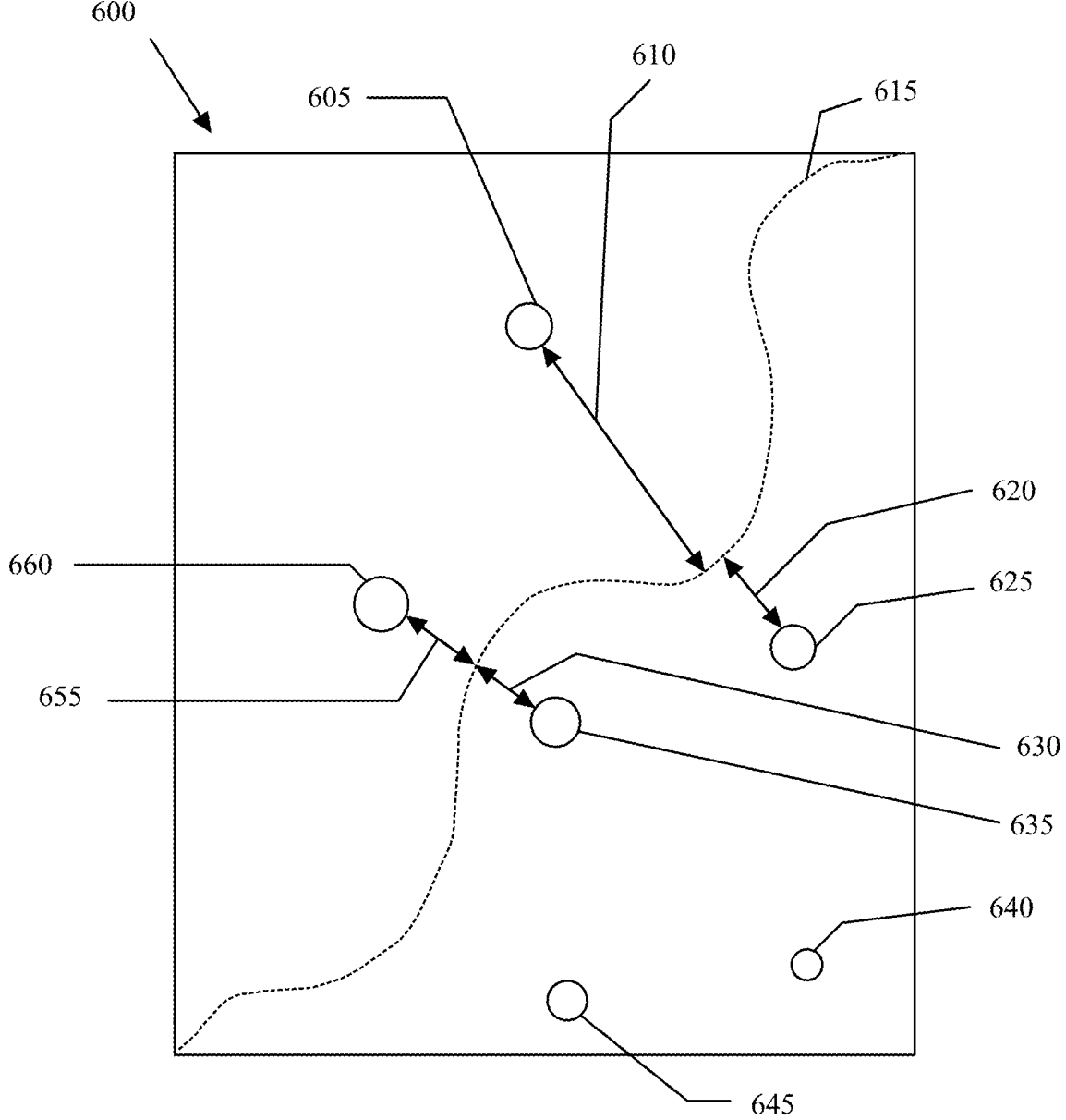
FIG. 6 is an illustration showing different abstract boundaries between vanilla paths, perturbed paths, and rudimentary paths.

FIG. 6 is an illustration showing different abstract boundaries between vanilla paths, perturbed paths, and rudimentary paths. Vanilla path 635 and perturbed path 660 are similar but may be labeled differently, thereby inducing an abstract boundary between 0-labeled and 1-labeled paths. Vanilla variant path 625 and perturbed variant path 605 are not as close to each other, and rudimentary paths 640 and 645 are pure Monte Carlo experimentally generated paths. Abstraction 655, 610, 620, and 630 may be a form of feature reduction, similar to the abstraction of a 3-dimensional map representation of a 2-dimensional map. Abstraction 655, 610, 620, and 630 may be from several features/dimensions to 2-dimensions. Although a 2-dimensional representation may be inaccurate a qualitative assessment can still be completed. One can compare two or more paths and to determine whether some are closer to the boundary than others, which means they are closer to inducing a collision or incident.

Generating a High Variance MLVO Dataset: During the termination of HybridPair-CE (step 4 of Listing 2), paths[0] of Vanilla-CE may be declared as vanilla path 635, and similarly for Perturbation-CE. Hence, HybridPair-CE may be capable of generating an interesting pair of 0 for vanilla path 635 and 1 for perturbation path 660.

Machine learning verification oracles (MLVOs) require a larger dataset; for example, when using a Random Decision Forest (RDF) to implement a classifier, an MLVO dataset typically contains 100 or more labeled observations. A poor dataset generation approach would then be to repeat Hybrid-Pair-CE 100 times. In this example, the result would be a low variance dataset, leading to a poorer quality MLVO. To increase the variance of the generated path pairs, all cost functions are augmented with constraints that promote high variance, such as:

Listing 5.
1. Let pathMetric(path), be a metric (i.e., mapping to a real number) of all parameters of a path (a sequence of positions and corresponding sequence of acceleration (or speed) values in each such position).
2. The t be the counter for the HybridPair-CE iteration, being in 1, . . . , 100 in the RDF example above.
3. Assuming a Gaussian distribution of path-to-path distances, maintain Gaussian distribution parameters for vanilla path 635 and perturbation path 660 paths as generated, one by one. Denote these parameters as $$\mu_V, \sigma_V^2 (\mu_P, \sigma_P^2).$$

4. Whenever a new path-pair is computed, both $$\mu_V, \sigma_V^2$$

and $$\mu_P, \sigma_P^2$$

are updated accordingly. For example, for a new vanilla path v-path:

$\mu_{V,t} = \mu_{V,t-1} *(N_{ds} - 1) + \text{pathmetric(vanilla path)}/N_{ds}$, $$\sigma_{V,t}^2 = \left( \sigma_{V,t-1}^2 * (N_{ds} - 1) + pathmetrick(\text{vanilla path}) - \mu_{V,t-1} \right)^2 / N_{ds}$$

where $N_{ds}$ is the current size of the dataset.
5. For HybridPair-CE iteration t: The Vanilla-CE score function for sample path k ($k \in [0,N)$) is augmented so that the closer it is to $\mu_{V,t} \pm 2^* \sigma_{V,t}$, the better it is scored (i.e., lower score value); likewise for the Perturbation-CE counterpart. Thereby, the CE score enforces a constraint that increases variance.

(Vanilla, perturbation) adverse path-pairs generated by HybridPair-CE induce an abstract boundary between 0 and 1—labeled paths. A slight perturbation of the parameters of the 0-labeled vanilla path 635 renders it a 1-labeled. A high-quality MLVO dataset requires training data that is not necessarily on that decision boundary 615, for example, a vehicle traveling along a similar sequence of locations as the vanilla path 635, yet whose accelerations sequence is sufficiently different from those of vanilla path 635.

Rudimentary paths 640 and 645 are those generated from distributions that are not iteratively updated by CE and are akin to Monte-Carlo generated paths; they represent naturalistic non-collision paths likely to be prevalent in randomly sampled real-world data. In contrast, vanilla variant path 625 and perturbation variant path 605 are paths that use the Hybrid distribution generated by Vanilla-CE (Perturbation-CE) but are not the best vanilla variant path 625 and perturbation variant path 605; rather, they are chosen randomly from within the elite set, noting that the entire elite set satisfies all rigid constraints (such as vanilla path 635 not colliding with a primary vehicle). Vanilla variant path 625 and perturbation variant path 605 are farther away from the decision boundary 615 lines than their (vanilla, perturbation) adverse path-pair counterparts.

The HybridPair simulation-based technique can be used to generate explainable MLVOs by configuring the constraints in the score function (Listing 1 or Listing 2) to address a specific natural language concern by using a disengagement report database similar to that of the California Department of Motor Vehicles (DMV) disengagement report database. In 2014, the California DMV began requiring companies testing autonomous vehicles on California public roads to submit disengagement reports. These reports record instances where the vehicle's autonomous control system is disengaged, either by the vehicle or by the human backup driver, and the California DMV publishes the disengagement reports (as well as crash reports) from all companies testing autonomous vehicles. Considering the California DMV report line item: "A vehicle in the right adjacent lane made an unsafe/unexpected lane change into the primary vehicle lane," such a line item is the driver for adding constraints to the Perturbation-CE score function that mandates a lane change within a short amount of time prior to its collision with a primary vehicle.

Completeness and Soundness of Heavyweight FV Proofs vs. MLVO:

Confusion Matrix
1. Completeness. A proof system is complete when every true statement has a proof.
2. Soundness. A proof system is sound when no false statement is proven true, that is, no false statement successfully masquerades as true.

Classical proof systems are expected to be 100% complete and 100% sound; that is, no proof error is allowed. In contrast, binary MLVO classifiers, being machine-learned objects, are evaluated using a confusion matrix (CM), depicted in Table 1.

|  | Positive Observation | Negative Observation |
| --- | --- | --- |
| Positive Prediction | Number of True Positives (TP) | Number of False Positives (FP) |
| Negative Prediction | Number of False Negatives (FN) | Number of True Negatives (TN) |

Two key quality metrics derived from a CM are Recall and Precision.

1. (True Positive Rate—TPR) percentage: 100*TP/(TP+FN) represents the percent of positive observations predicted to be positive.
2. Precision percentage: 100*TP(TP+FP) represents the percent of positive predictions that have positive observations. Using 100*FP(TP+FP), precision represents the percent of positive predictions that have negative observations, that is, predictions that successfully masquerade as positive.

Precision for MLVO is what Soundness is for a FV proof. Using two terms:

1. Fact: represents a true statement—in the FV world and a positive observation—in the MLVO world.
2. Cheat: represents a false statement—in the FV world and a negative observation—in the MLVO world.

| Completeness and Recall | Percent of facts that are successfully proven/predicted true |
| --- | --- |
| Soundness and Precision | Percent of cheats that are successfully proven/predicted true (i.e., successfully masquerade) |

FIG. 7 is a process flow block diagram of one embodiment of a method of verification and advanced notice for an autonomous system.

Hybrid-Pair-Cross Entropy method of verification and advanced notice for an autonomous system 700, creating a path position probability transition matrix 705 the path position probability transition matrix may include an acceleration parameters array of one or more acceleration parameters for a potential position, the path position probability transition matrix preferably has equal probabilities for creating a samples array, evaluating a sample path, sorting a sample path, and using $N^e$ elite path; creating a samples array 710 with one or more paths, each path being a sequence of grid points of a two-dimensional grid that includes position and acceleration, the position is preferably a sampled position from the probability distribution of the path probability transition matrix, and the acceleration is a sampled acceleration from the acceleration probability distribution associated with the sampled position; evaluating a sample path 715 where a custom score function asserts a potential position and a potential acceleration that identifies a collision path of a perturbation-adversary and the primary vehicle and a no collision vanilla path of the adversary vehicle and the primary vehicle, a small position and acceleration distance between perturbation-adversary and vanilla-adversary vehicles, the custom score function prioritizes a high priority sample path as a slight deviation from a non-colliding path that result in a collision in the $N^e$ elite paths, the custom score function prioritizes successively different colliding or non-colliding paths to generate a high-variance dataset, wherein the high-variance data set trains a machine learning model; sorting the sample path 720 based on a corresponding score from the custom score function and selecting a subset of the sample paths as $N^e$ elite paths; using the $N^e$ elite paths to update the path probability transition matrix and the acceleration parameters array 730; repeating until the $N^e$ elite paths stabilizes 735 for a predetermined number of iterations; updating the path probability transition matrix by the number of times the $N^e$ elite paths transitions from location i to location j, divided by N2 740; updating Gaussian parameters pairs of the acceleration parameters array 745 by and, accel[k, i] is the acceleration in cell i of the two-dimensional grid according to a k elite path. The custom score function prioritizes a high-priority sample path as a slight deviation from a non-colliding path, resulting in a collision in the $N^e$ elite paths. The custom score function prioritizes successively different colliding or non-colliding paths to generate a high-variance dataset, and the high-variance data set trains a machine learning model.

The number of iterations or the number (D) may be determined by a developer based on whether sufficiently better results being generated by increasing the number of iterations. Increasing the number of iterations may slows down the application.

The method may further include an independent adversary vehicle, the adversary vehicle, and the primary vehicle on the same route, and the custom score function asserts a potential position and a potential acceleration to identify a no collision between the adversary vehicle and independent adversary vehicles, and a small position and acceleration distance between perturbation-adversary and independent-adversary vehicles.

The sample paths of the independent adversary vehicle and the primary vehicle should not collide.

Realistic scenarios may be simulated from autonomous vehicle reporting databases, and dissimilar collision and non-collision paths contribute to model robustness.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

Some portions of the preceding detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the present disclosure, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The processes or methods depicted in the figures may be performed by processing logic that comprises hardware (e.g., circuitry, dedicated logic, etc.), firmware, software (e.g., embodied on a non-transitory computer readable medium), or a combination thereof. Although the processes or methods are described above in terms of some sequential operations, it should be appreciated that some of the operations described may be performed in a different order. Moreover, some operations may be performed in parallel rather than sequentially.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A method of training and verification of an autonomous system, comprising:
by a machine learning classifier, wherein an adversary vehicle, and a primary vehicle are on a same path;
creating a path position probability transition matrix, wherein the path position probability transition matrix comprises:
an acceleration parameters array of one or more acceleration parameters for a potential position, and
equal probabilities for creating a samples array, evaluating a sample path, sorting the sample path, and using an $N^e$ elite path;
creating the samples array, wherein the samples array is one or more paths, wherein the one or more paths are a sequence of grid points of a two-dimensional grid, wherein the sequence of grid points comprise: a sampled position and a sampled acceleration, wherein the sampled position is from a probability distribution of the path position probability transition matrix, and wherein the sampled acceleration is from an acceleration probability distribution associated with the sampled position;
evaluating the sample path, wherein a custom score function asserts the potential position and a potential acceleration to identify a collision path of a perturbation-adversary and the primary vehicle, a no collision path of the adversary vehicle and the primary vehicle, a position distance and an acceleration distance between the adversary vehicle and the primary vehicle;
sorting the sample path, based at least in part a custom score of a custom score function and selecting a subset of the sample path as the $N^e$ elite path;
using the $N^e$ elite paths to update the path position probability transition matrix and the acceleration parameters array;
repeating all steps until the $N^e$ elite path stabilizes; and
wherein a high-variance dataset trains a machine learning model;
wherein the custom score function prioritizes a high priority sample path as a deviation from the no collision path that results in a collision in the $N^e$ elite paths; and
wherein the custom score function prioritizes successively the collision path or the no collision paths to generate the high variance dataset.

2. The method of claim 1, further comprising:
updating the path position probability transition matrix by the number of times the $N^e$ elite paths transitions from location i to location j, divided by $N^2$; and
updating Gaussian parameters pairs of the sampled acceleration parameters array as follows:

$$\mu_i = \frac{1}{N^e}\sum_{K=0}^{N^e} accek[k, i]$$

$$\sigma_i^2 = \frac{1}{N^e}\sum_{k=0}^{N^e}(\mu_i - accel[k, i])^2$$

wherein accel[k, i] is the sampled acceleration in cell i of the two-dimensional grid according to a k elite path.

3. The method of claim 1, further comprising an independent adversary vehicle, wherein the independent adversary vehicle, a vanilla adversary vehicle, the adversary vehicle, and the primary vehicle are on the same path; and
wherein the custom score function asserts the potential position and the potential acceleration to identify a no collision path between the adversary vehicle and the independent adversary vehicle, and the position distance and the acceleration distance between the adversary vehicle and independent adversary vehicle.

4. The method of claim 3, wherein the sample path of the independent adversary vehicle and the primary vehicle are configured not to collide.

5. The method of claim 1, further comprising:

simulating scenarios for one or more autonomous vehicle reporting databases.

6. The method of claim 1, further comprising:

adding one or more random sample paths the high-variance dataset; and wherein the one or more random sample paths represent one or more naturalistic paths.

7. The method of claim 1, wherein one or more different collision paths and the no collision paths contribute to model robustness.

8. A system for training, verifying, and providing advance notice, the system comprising a non-transitory computer readable medium storing instruction executable by a processor, wherein the instructions comprise instructions to:

by a machine learning classifier, wherein an adversary vehicle, and a primary vehicle are on a same path;

creating a path position probability transition matrix, wherein the path position probability transition matrix comprises:

an acceleration parameters array of one or more acceleration parameters for a potential position, and equal probabilities for creating a samples array, evaluating a sample path, sorting the sample path, and using an $N^e$ elite path;

creating the samples array, wherein the samples array is one or more paths, wherein the one or more paths are a sequence of grid points of a two-dimensional grid, wherein the sequence of grid points comprise: a sampled position and a sampled acceleration, wherein the sampled position is from a probability distribution of the path position probability transition matrix, and wherein the sampled acceleration is from an acceleration probability distribution associated with the sampled position;

evaluating the sample path, wherein a custom score function asserts the potential position and a potential acceleration to identify a collision path of a perturbation-adversary and the primary vehicle, a no collision path of the adversary vehicle and the primary vehicle, a position distance and an acceleration distance between the adversary vehicle and the primary vehicle;

sorting the sample path, based at least in part a custom score of a custom score function and selecting a subset of the sample path as the $N^e$ elite path;

using the $N^e$ elite paths to update the path position probability transition matrix and the acceleration parameters array;

repeating all steps until the $N^e$ elite path stabilizes; and wherein a high-variance dataset trains a machine learning model;

wherein the custom score function prioritizes a high priority sample path as a deviation from the no collision path that results in a collision in the $N^e$ elite paths; and wherein the custom score function prioritizes successively the collision path or the no collision paths to generate the high variance dataset.

9. The system of claim 8, the instructions further comprising:

updating the path position probability transition matrix by the number of times the $N^e$ elite paths transitions from location i to location j, divided by $N^2$; and updating Gaussian parameters pairs of the sampled acceleration parameters array as follows:

$$\mu_i = \frac{1}{N^e}\sum\nolimits_{K=0}^{N^e} accek[k, i]$$

$$\sigma_i^2 = \frac{1}{N^e}\sum\nolimits_{k=0}^{N^e}(\mu_i - accel[k, i])^2$$

wherein accel[k, i] is the sampled acceleration in cell i of the two-dimensional grid according to a k elite path.

10. The system of claim 8, further comprising an independent adversary vehicle, wherein the independent adversary vehicle, the primary vehicle, and the adversary vehicle are on the same path; and wherein the custom score function asserts the potential position and the potential acceleration to identify a no collision path between adversary and independent adversary vehicles, and the position distance and the acceleration distance between adversary vehicle and independent adversary vehicle.

11. The system of claim 10, wherein a sample path of the independent-adversary and the primary vehicle are configured not to collide.

12. The system of claim 8, wherein one or more autonomous vehicle reporting databases are configured to simulate a scenario.

13. The system of claim 8, further comprising:

adding one or more random sample paths to the high-variance dataset; and wherein the one or more random sample paths represent one or more naturalistic paths.

14. The system of claim 8, wherein one or more different collision paths and the no collision paths contribute to model robustness.

15. A Hybrid-Pair-Cross Entropy method of training and verification for an autonomous system, the method comprising:

by an adversary vehicle and a primary vehicle, wherein the adversary vehicle, and the primary vehicle are on a same path;

creating a path position probability transition matrix, wherein the path position probability transition matrix comprises:

an acceleration parameters array of one or more acceleration parameters for a potential position, and equal probabilities for creating a samples array, evaluating a sample path, sorting the sample path, and using an $N^e$ elite path;

creating the samples array, wherein the samples array is one or more paths, wherein the one or more paths are a sequence of grid points of a two-dimensional grid, wherein the sequence of grid points comprise: a sampled position and a sampled acceleration, wherein the sampled position is from a probability distribution of the path position probability transition matrix, and wherein the sampled acceleration is from an acceleration probability distribution associated with the sampled position;

evaluating the sample path, wherein a custom score function asserts a potential position and a potential acceleration to identify a collision path of a perturbation-adversary and the primary vehicle, a no collision path of adversary vehicle and the primary vehicle, a position distance and an acceleration distance between adversary and primary vehicle, wherein the custom score function prioritizes a high priority sample path as a deviation from a non-colliding path that result in a collision in an $N^e$ elite paths, wherein the custom score function prioritizes successively different the collision path or the no collision paths to generate a high-variance dataset, wherein the high-variance data set trains a machine learning model;

sorting the sample path based on a corresponding score from the custom score function and selecting a subset of the sample path as the $N^e$ elite path;

using the $N^e$ elite paths to update the path position probability transition matrix and the acceleration parameters array;

repeating the steps above until the $N^e$ elite path stabilizes;

updating the path position probability transition matrix by the number of times the $N^e$ elite paths transitions from location i to location j, divided by $N^2$;

updating Gaussian parameters pairs of the acceleration parameters array as follows:

$$\mu_i = \frac{1}{N^e} \sum_{K=0}^{N^e} accek[k, i]$$

$$\sigma_i^2 = \frac{1}{N^e} \sum_{k=0}^{N^e} (\mu_i - accel[k, i])^2$$

wherein accel[k, i] is the acceleration in cell i of the two-dimensional grid according to a k elite path;

wherein the high-variance data set trains the machine learning model wherein the custom score function prioritizes a high priority sample path as a deviation from the no collision path that results in a collision in the $N^e$ elite paths; and wherein the custom score function prioritizes successively the collision path or the no collision paths to generate the high variance dataset.

16. The method of claim 15, further comprising an independent adversary vehicle, wherein the independent adversary vehicle, the adversary vehicle, and the primary vehicle are on the same path; and wherein the custom score function asserts the potential position and the potential acceleration to identify a no collision path between the adversary vehicle and independent adversary vehicle, and the position distance and the acceleration distance between the adversary vehicle and the independent adversary vehicle.

17. The method of claim 16, wherein a sample path of the independent adversary vehicle and the primary vehicle are configured not to collide.

18. The method of claim 17, further comprising:

simulating scenarios for one or more autonomous vehicle reporting databases; and wherein one or more different collision paths and the no collision paths contribute to model robustness.

* * * * *